(12) United States Patent
Di Emidio

(10) Patent No.: US 9,328,216 B2
(45) Date of Patent: May 3, 2016

(54) CLAYEY BARRIERS

(75) Inventor: Gemmina Di Emidio, Ghent (BE)

(73) Assignee: Universiteit Gent, Ghent (BE)

( * ) Notice: Subject to any disclaimer, the term of this patent is extended or adjusted under 35 U.S.C. 154(b) by 206 days.

(21) Appl. No.: 13/817,835

(22) PCT Filed: Aug. 24, 2011

(86) PCT No.: PCT/EP2011/064542
§ 371 (c)(1),
(2), (4) Date: Feb. 20, 2013

(87) PCT Pub. No.: WO2012/025564
PCT Pub. Date: Mar. 1, 2012

(65) Prior Publication Data
US 2013/0145959 A1    Jun. 13, 2013

(30) Foreign Application Priority Data
Aug. 27, 2010   (EP) ..................................... 10174313

(51) Int. Cl.
*C08K 3/34* (2006.01)
*B09B 1/00* (2006.01)
*C04B 28/00* (2006.01)
*E02D 31/00* (2006.01)
*C04B 111/00* (2006.01)

(52) U.S. Cl.
CPC .................. *C08K 3/346* (2013.01); *B09B 1/004* (2013.01); *C04B 28/001* (2013.01); *E02D 31/004* (2013.01); *C04B 2111/00775* (2013.01); *Y02W 30/32* (2015.05)

(58) Field of Classification Search
None
See application file for complete search history.

(56) References Cited

U.S. PATENT DOCUMENTS

| 4,897,309 A | 1/1990 | Haas et al. |
| 6,806,298 B1 | 10/2004 | Nachtman et al. |
| 7,026,385 B2 * | 4/2006 | Wammes et al. ............. 524/446 |

FOREIGN PATENT DOCUMENTS

WO    90/13598 A1    11/1990

OTHER PUBLICATIONS

Hydraulic Conductivity of a Dense Prehydrated GCL; Impact of Free Swell and Selling Pressure> Gemmina De Emidio et al.*
The International Preliminary Report on Patentability, dated Mar. 5, 2013 for PCT Application No. PCT/EP2011/064542.
Di Emidio et al., entitled "Hydraulic conductivity of a dense prehydrated GCL; impact of free swell and swelling pressure," EuroGeo 4 The Fourth Geosynthetics Conference, Paper No. 320, Sep. 10, 2008, pp. 1-7.
Stutzmann Th. et al., entitled Contribution to the adsorption mechanism of acetamide and polyacrylamide on to clays: Clays & Clay Minerals 25, 392-406, 1977.
Stutzmann Th. et al., entitled "Contribution to the adsorption mechanism of acetamide and polyacrylamide on to clays," Clays & Clay Minerals 25, 392-406.

* cited by examiner

*Primary Examiner* — Melvin C Mayes
*Assistant Examiner* — Colette Nguyen
(74) *Attorney, Agent, or Firm* — Amster, Rothstein & Ebenstein LLP

(57) ABSTRACT

The present invention relates to improved clayey barriers, such as compacted clay liners or geosynthetic clay liners, which can be used, among other uses, to isolate waste liquids from the environment. More in particular, the present invention relates to clay which is treated with an anionic polymer and is subsequently dehydrated before it is used as a barrier. The latter improved clays are surprisingly well, and for a long term, protected from chemical attack by aggressive electrolyte solutions present in, for example, sea water or waste liquids.

14 Claims, 14 Drawing Sheets

(a)

(b)

CLAYEY BARRIERS

CROSS-REFERENCE TO RELATED APPLICATIONS

This application is a U.S. national stage entry under 35 U.S.C. §371 of PCT International Patent Application No. PCT/EP2011/064542, filed Aug. 24, 2011, which claims priority to European Patent Application No. 10174313.6, filed Aug. 27, 2010, the contents of which are incorporated herein by reference in their entirety.

TECHNICAL FIELD OF INVENTION

The present invention relates to improved clayey barriers, such as compacted clay liners or geosynthetic clay liners, which can be used, among other uses, to isolate waste liquids from the environment. More in particular, the present invention relates to clay which is treated with an anionic polymer and is subsequently dehydrated before it is used as a barrier. The latter improved clays are surprisingly well, and for a long term, protected from chemical attack by aggressive electrolyte solutions present in, for example, sea water or waste liquids.

BACKGROUND ART

Waste liquids in the environment may result from several sources, e.g. uncontrolled dumping of pure solvents, spills or infiltration of water through solid waste in landfill disposals resulting in contaminated leachate. Contaminants in this leachate can lead to significant damage to the environment and to the human health due to their mobility and solubility.

Clayey barriers are used to isolate pollutants from the environment. Bentonite clay is widely used in barriers for landfill systems because of its elevated sealing capacity in presence of water. However, exposure to leachate can cause loss of efficiency of the clay as hydraulic barrier with consequent harm to the environment. Clays have therefore been engineered in order to improve their chemical and physical properties.

Extensive research has been conducted to characterize the sorption of organic compounds onto clay surfaces (Lo et al. 1997; Lorenzetti et al. 2005; Bartelt-Hunt et al. 2005). Organobentonites are clays, typically amended by exchanging quaternary ammonium cations for the naturally occurring sodium. This process renders the modified clay hydrophobic and highly organophilic. Organically modified clays have been found to be a promising to resist pollutant transport (Lo et al. 1997). Bentonites modified with ammonium compounds (organoclays) have sorption capacities for organic compounds 4-5 times higher than untreated clays (Lorenzetti et al., 2005). However, the hydraulic conductivity of organoclays—an essential characteristic for being a performing clayey barrier—increases significantly upon modification with organics.

Multi-Swellable Bentonite (MSB), developed by Kondo (1996), is a bentonite which has been mixed with Propylene Carbonate (PC) to activate the osmotic swelling capacity. Propylene Carbonate is placed in the interlayer of the smectite and attracts numerous water molecules. This results in a strong swelling ability even if the permeant contains polyvalent cations or a high concentration of monovalent cations (Onikata et al., 1999). The hydraulic conductivity of MSB is one to two orders of magnitude lower than that of the untreated clay (Katsumi et al., 2008). On the other hand, after prolonged prehydration with water, the hydraulic conductivity of the MSB increases one order of magnitude due to the release of the PC during prehydration due to the weak bound of the PC to the clay (Mazzieri and Pasqualini, 2006; Mazzieri et al., 2010). Moreover, swell index tests were performed on the MSB specimen at the end of a chemico-osmotic/diffusion test (Mazzieri et al. 2010). The latter tests demonstrated that the MSB converted into a Ca-exchanged bentonite which is partially or totally deprived of PC and of the swelling properties initially conferred by PC.

U.S. Pat. No. 6,537,676 discloses a dense prehydrated geosynthetic clay liner (DPH GCL) which is densified by calendering after prehydration with a polymeric solution containing sodium carboxymethyl cellulose (Na-CMC), sodium polyacrylate, methanol and other ingredients. This DPH GCL performs well in various aggressive solutions (Schroeder et al. 2001, Kolstad et al. 2004, Di Emidio et al., 2008, Katsumi, 2008). Polyacrylate compounds in this DPH GCL can replace the sodium cations of the clay to avoid ion exchange, enhancing the impermeable behavior under aggressive conditions (Flynn and Carter, 1998). However, DPH GCL contains numerous components which complicates its production. Moreover, the polymer adsorption on to the DPH GCL occurs without dehydration at high temperatures. This method of preparation may release the polymers in the long term. Mazzieri and Pasqualini (2008) studied the permeability of the DPH GCL subjected to dry/wet cycles and using a 12.5 mM CaCl2 solution as hydrating liquid. They observed that the polymer was probably removed during the test.

Cationic polymers dissolved in a solution may adsorb easily to both sand and clay surfaces (Stumm, 1992). Such adsorption in clays can be irreversible and entropy-driven because a cationic polymer chain displaces many water molecules and contains thousands of cations which would need to be displaced simultaneously (Theng, 1982; Ashmawy et al., 2002). For this reason cationic polymers can protect the clay from cation exchange, that is the main reason for the increase of permeability. However, cationic polymer amendments provide no improvement to the hydraulic conductivity of bentonites (McRory and Ashmawy, 2005). The reason of this behavior is probably due to the compression of the double layer thickness caused by the presence of the cationic polymers, and to the tendency of flocculation instead of dispersion.

U.S. Pat. Nos. 6,340,385 and 7,026,385 disclose a well-defined mixture of sand (lower than 89.1% by dry weight), bentonite (higher than 10.7% by dry weight) and a special polymer (higher than dry 0.2% by weight). However, these mixtures are not dehydrated before usage as a clay liner. On the other hand, a sand-bentonite-mixture used as compacted clay liner has already a good sealing property, which, together with other geotechnical properties, is considerably amended by the polymer additive (Simon and Müller, 2005). The synthetic additive is a high molecular weight, hydrophilic and gel-forming polymer. Therefore, all water transport processes in the mixture are strongly retarded by the polymer. In addition it gives rise to some internal cohesion in the sand-bentonite mixture. This clay liner has a hydraulic conductivity one order of magnitude lower than conventional compacted clay liners (Simon and Müller, 2005). However, its long-term performance is questionable as its method of preparation could lead to weak bonds. Indeed, the polymer (acrylamide) and the clay is mixed in dry conditions and this type of dry mixing lead to weaker bonds compared to drying the slurry of clay and polymers after wet-mixing.

WO90/13598 and U.S. Pat. No. 6,806,298 disclose a composition which can be used as a cover layer and comprises a polymer, clay and water. However, these composition are not dehydrated before they are used as a cover layer.

Di Emidio et al. 2008 (EuroGeo4, paper 320) describe the evaluation of a dense prehydrated geosynthetic clay liner comprising bentonite and the addition of polymers. However, also this clay liner is not dehydrated before it is used as a clay liner.

Stutzmann and Siffert (1977) compared the quality of the adsorption of anionic polymers on to montmorillonite surface for two scenarios: (a) drying the treated clay either at 60° C. and (b) drying under vacuum at 20° C. They found that the adsorption of the polymer on the montmorillonite after drying at 60° C. can be considered as intense, irreversible fixation, corresponding to chemisorption. On the other hand, the adsorption observed with vacuum drying corresponds rather to an unstable adsorption equilibrium, such as a reversible physisorptive adsorption. This study was undertaken to understand the retention of additives used in tertiary recovery of petroleum. However, these authors did clearly not demonstrate nor suggest that adsorption of the polymers influences the hydraulic performance of the clay.

Hence, it is clear that there is still a need for an industrially useful and easy method to engineer a clay which is well protected—and for a sufficiently long time period—from chemical attack by aggressive electrolyte solutions so that said it can be used as a clayey barrier having superior properties.

DESCRIPTION OF INVENTION

Figure 12:
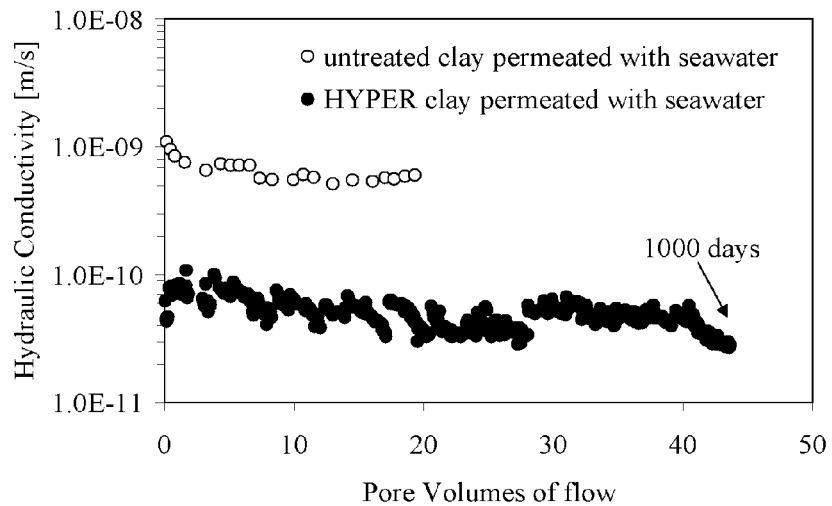
FIG. 12. a) The hydraulic conductivity of the HYPER clay 2% to sea water is one order of magnitude much lower than that of the untreated clay even after 1000 days of permeation; b) The electrical conductivity of the outlet solution of the HYPER clay 2% permeated with sea water compared to the reference electrical conductivity of the inlet FIG. 13. Decrease of the hydraulic conductivity to 5 mM $CaCl_2$ of the HYPER clay 2% and HYPER clay 8% compared to the untreated clay. The hydr. cond. of the HYPER clay 8% to 5 mM $CaCl_2$ is comparable to the hydr. cond. to deionized water.
Figure 12:
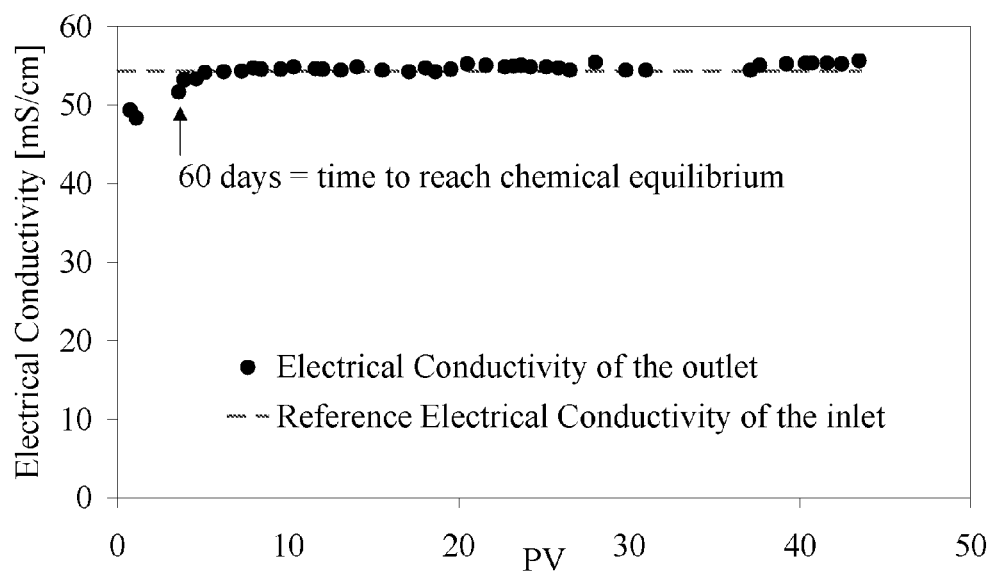
Figure 13:
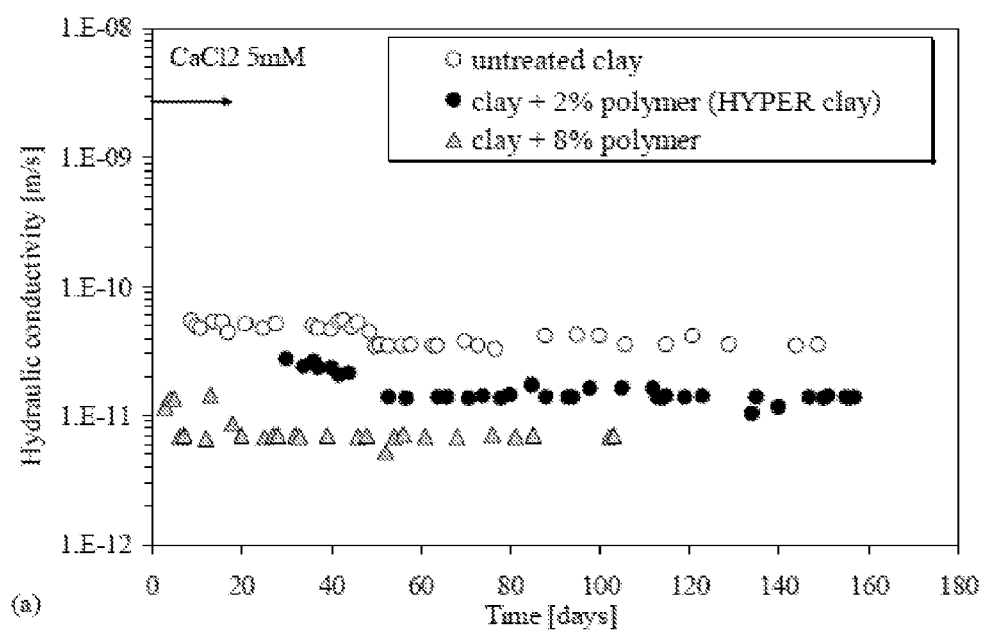
Figure 14:
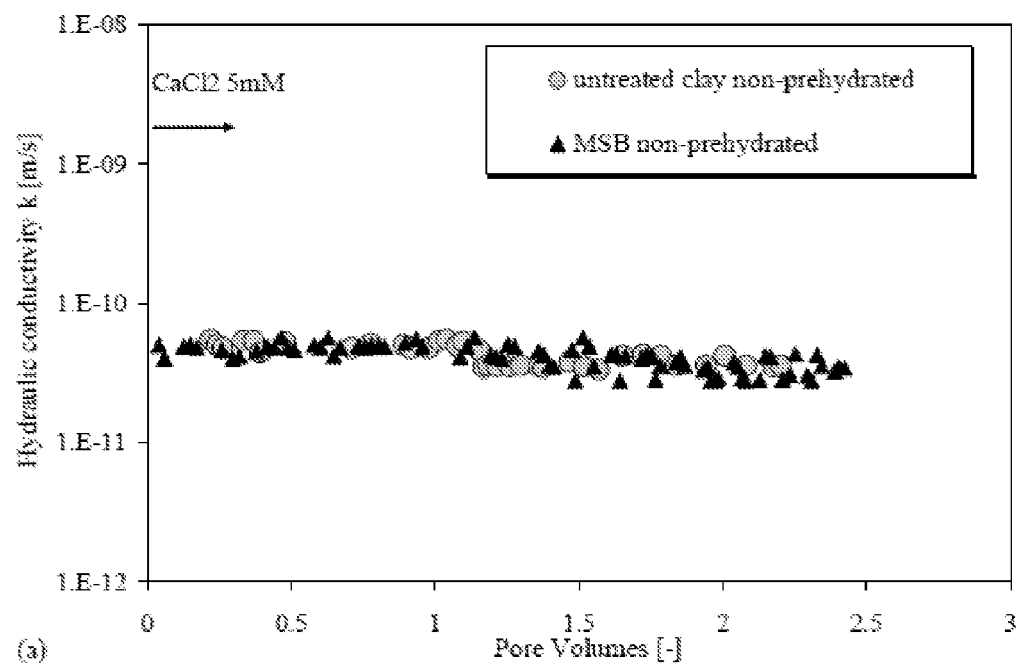
FIG. 14. The hydraulic conductivity to $CaCl_2$ 5 mM of the MSB showed no improvement compared to the hydraulic conductivity of the untreated clay.

The present invention provides an industrially useful and easy method to engineer a clay which is well protected—and for a sufficiently long term—from chemical attack by aggressive electrolyte solutions so that said it can be used as a clayey barrier having superior properties. The engineered clay of the present invention comprises clay such as bentonite and an anionic polymer such as sodium carboxymethyl cellulose and has the following characteristics: 1) a dispersed clay structure resulting in a decreased hydraulic conductivity. For example, the present invention demonstrates that the basal spacing, d, of the untreated clay was d=1.235 nm which is lower than that of the HYPER clay 2% (i.e. 98% clay and 2% anionic polymer by dry weight) that has d=1.239 nm which is lower than that of the HYPER clay 8% (i.e. 92% clay and 8% anionic polymer by dry weight) with d=1.24 nm and lower than that of the HYPER clay 16% (i.e. 84% clay and 16% anionic polymer by dry weight) with d=1.241 nm, 2) an increased water adsorption capacity. For example, the present invention demonstrates that the liquid limit (LL) of the untreated clay in sea water was LL=122%, lower than that of the HYPER clay 2% that was LL=139.5%, and than that of the HYPER clay 4% that was LL=205.77%, and lower than that of the HYPER clay 8% LL=240.51%, and HYPER clay 16% with LL=322.75%; 3) an improved swelling ability. For example, the present invention demonstrates that the swell index (SI) of the untreated clay to water was SI=26 ml/2 g lower than that of the HYPER clay 2% with SI=37 ml/2 g and that of the HYPER clay 4% with SI=55 ml/2 g; and, the swell pressure, SP, of the untreated clay in a $CaCl_2$ 5 mM solution was SP=50 kPa lower than that of the HYPER clay 2% that was SP=93 kPa, than that of the HYPER clay 8% that was SP=420 kPa, and than that of the HYPER clay 16% that was SP=310 kPa, 4) a low hydraulic conductivity, k, to, for example, $CaCl_2$ and sea water in the long term compared to the hydraulic conductivity of the untreated clay. For example, the present invention demonstrates that $k_{clay}$(to water)=$6.42*10^{-12}$ m/s; $k_{clay}$(to $CaCl_2$ 5 mM)=$3.53*10^{-11}$ m/s; $k_{clay}$(to seawater)=$6*10^{-10}$ m/s; $k_{hyperclay2\%}$(to water)=$6.5*10^{-12}$ m/s; $k_{hyperclay2\%}$(to $CaCl_2$ 5 mM)=$1.37*10^{-11}$ m/s; $k_{hyperclay2\%}$(to seawater)= $4.17*10^{-11}$ m/s; 5) a favorable chemico-osmotic efficiency in the long term. For example, the present invention demonstrates that ($\omega_{clay(CaCl2=1\ mM)}$=0.29; $\omega_{clay(CaCl2=5\ mM)}$=0, $\omega_{hyperclay2\%(CaCl2=1\ mM)}$=0.65; $\omega_{hyperclay2\%(CaCl2=5\ mM)}$= 0.13; and 6) a low diffusion coefficient. For example, the present invention demonstrates that ($D_{clay}(Cl^-)$=$2.22*10^{-10}$ $m^2/s$; $D_{clay}(Ca^{2+})$=$2.22*10^{-10}$ $m^2/s$; $D_{hyperclay2\%}(Cl^-)$= $1.67*10^{-10}$ $m^2/s$; $D_{hyperclay2\%}(Ca^{2+})$=$1.35*10^{-10}$ $m^2/s$). In other words, and for example, the present invention relates to engineered clays having the following characteristics: a basal spacing d>1,235 nm, a liquid limit LL>122%, a swell index SI>26 ml/2 g, a swell pressure SP>50 kPA, a hydraulic conductivity k to $CaCL_2$<$3,53\ 10^{-11}$ m/s and to seawater <$6\ 10^{-10}$ m/s, a chemico-osmotic efficiency $\omega_{CaCl2=1\ mM}$>0.29 and/or a diffusion coefficient D($Cl^-$ or $Ca^{2+}$)>$2.22\ 10^{-10}$ $m^2/s$. The latter superior characteristics make the improved clay of the present invention suitable to be used as a barrier and, more importantly, suitable to be used as a barrier for a long term. The term 'a long term' refers to the efficiency of the improved clay in the 'long term' which mainly depends on the time required to reach chemical equilibrium. If after that period of time to reach chemical equilibrium the hydraulic conductivity remains low (as is for example shown in FIG. 12b), then the improved clay is suitable to be used as a barrier for 'a long term'. In other words, the term 'a long term' refers to the service life of the improved clay in a landfill which corresponds to the time required to increase its hydraulic conductivity to a value higher than a required value. The end of the service life usually occurs when the chemical equilibrium is reached because at that moment the hydraulic conductivity could increase. However, the hydraulic conductivity of the improved clay of the present invention remains very low for at least 1000 days of permeation under laboratory conditions. This means that the hydraulic conductivity of the improved clay is not increasing after chemical equilibrium is reached as it occurs for untreated—control clays. Hence, the improved clay of the present invention is suitable to be used as a barrier for a long term: i.e. for at least 1000 days. Moreover, the service life of a clay under laboratory conditions is always lower compared to the service life in the field which can be calculated as indicated in Shackelford (2005). Hence, the improved clay of the present invention can have a service life in the field of at least 2000, 3000, 4000, 5000, 6000, 7000, 8000, 9000, 10,000 or more days.

The clay of the present invention can be made by wetting the clay by mixing the clay with a solution comprising an anionic polymer and subsequently drying (dehydrating) the slurry of clay and polymers in order to expel the water molecules and adsorb the polymer on the clay surface.

Hence, the present invention relates to the use of a composition as a hydraulic clayey barrier wherein said composition is obtainable by a) mixing a dry clay with an anionic polymer solution to obtain a clay treated with an anionic polymer, and b) dehydrating said clay treated with an anionic polymer. In other words, the present invention relates to a process for providing a hydraulic clayey barrier using a composition obtainable by a) mixing a dry clay with an anionic polymer solution to obtain a clay treated with an anionic polymer, and b) dehydrating said clay treated with an anionic polymer. The term 'hydraulic clay barriers' refers to clayey barriers which are often, but not solely, used to isolate harmful contaminants from the environment. According to international regulations, landfills must be constructed with containment systems with low hydraulic conductivity in order to avoid contamination of groundwater and soil. Usually, a compacted clay liner (CCL) is used in cover systems and bottom liners for landfills. CCLs are natural clay material compacted in situ with a minimum thickness prescribed by national regulations. Over the past decades, geosynthetic clay liners (GCLs), which are factory-manufactured clay liners consisting of a thin layer of bentonite encased by geotextiles or glued to a geomembrane, have gained widespread popularity as a substitute for compacted clay liners. The purpose of hydraulic clayey barriers is to isolate waste liquids from the environment. However, a skilled person will comprehend that the composition of the present invention can be used as any kind of barrier. Non-limiting examples of such uses are: using the composition of the present invention as a sealing (bentonite) powder or paste to seal e.g. construction (concrete, steel, tubes, etc . . . ) joints and seal around penetrations, to seal below-ground waterproof systems, to seal boreholes and underground excavations in rocks and to seal overlap GCL joints. The term 'composition' refers to a compound comprising clay and an anionic polymer and having specified superior characteristics (as indicated above) which make the composition suitable to be used as a barrier. The latter superior characteristics are the result of the methodology of making said composition. The latter methodology comprises in essence: 1) wetting the clay by mixing the clay with a solution comprising an anionic polymer or, in other words, mixing a dry clay with an anionic polymer solution to obtain a clay treated with an anionic polymer and subsequently 2) drying the slurry of clay and polymers in order to expel the water molecules and adsorb the polymer on the clay surface or, in other words dehydrating said clay treated with an anionic polymer. The term 'clay' refers to well-known geologically cohesive materials having extremely low hydraulic conductivity, or permeability, to liquids and gases. The term 'anionic polymer' refers to a composition composed of many monomer units joined together via a polymerization reaction. The latter polymers are further characterized by the existence of anionic (negatively electrically charged) site groups on the polymer molecule. The term 'mixing' refers to any method known in the art such as mixing with a dough mixer or mixing with a high speed shear mixer.

The present invention further relates to the usage as described above wherein said clay is bentonite and/or wherein said anionic polymer is sodium carboxymethyl cellulose. Bentonite clay is widely used in hydraulic barriers because of its elevated sealing capacity in presence of water. Bentonite is a well-known member of the clay family of geologically cohesive materials having extremely low hydraulic conductivity, or permeability, to liquids and gases. Of the various types, sodium bentonite is known to have the lowest permeability of any naturally occurring geologic material. However, exposure to high concentrations of inorganic solutions can change the clay fabric increasing its hydraulic conductivity, with a consequent enormous harm to the environment. A skilled person will appreciate that other clays than bentonite such as natural soil, dredging soil, natural clay, silt, kaolin, illite, smectite, vermiculite and mixtures thereof can be used.

Figure 3:
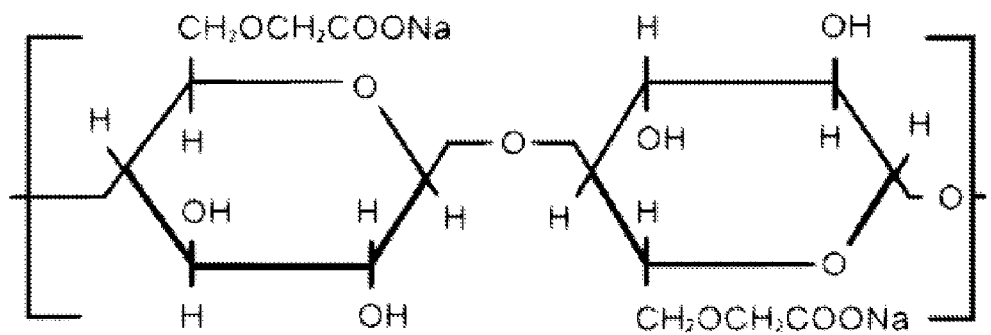
FIG. 3: Chemical formula of the Carboxymethylcellulose Anionic Polymer.

Carboxymethyl cellulose (CMC) is a cellulose derivative with carboxymethyl groups (—CH2-COOH) bound to some of the hydroxyl groups of the glucopyranosemonomers that make up the cellulose backbone (see FIG. 3). It is often used as its sodium salt, Sodium Carboxymethyl Cellulose (Na—

CMC). The CMC is synthesized by the alkali-catalyzed reaction of cellulose with chloroacetic acid. The polar (organic acid) carboxyl groups render the cellulose soluble and chemically reactive. The functional properties of CMC depend on the degree of substitution of the cellulose structure (i.e., how many of the hydroxyl groups have taken part in the substitution reaction), as well as the chain length of the cellulose backbone structure and the degree of clustering of the carboxymethyl substituents. CMC is used in food science as a viscosity modifier or thickener, and to stabilize emulsions in various products including ice cream. It is also a constituent of many non-food products, such as toothpaste, paints, detergents and various paper products. It is used primarily because it has high viscosity, is non-toxic, and is non-allergenic. In laundry detergents it is used as a soil suspension polymer designed to deposit onto cotton and other cellulosic fabrics creating a negatively charged barrier to soils in the wash solution. CMC is also used in the oil drilling industry as an ingredient of drilling mud, where it acts as a viscosity modifier and water retention agent. Insoluble microgranular carboxymethyl cellulose is used as a cation-exchange resin in ion-exchange chromatography for purification of proteins. A skilled person will appreciate that other 'anionic' polymers than CMC such as polyacrylates, polyacrylamides, any anionic polymer capable to adsorb on to the clay surface through the cations that behave like bridges, any anionic or non-ionic polymer able to intercalate the interlayer region of a clay and able to maintain a thick diffuse double layer, any water adsorbent polymer and/or any mixture thereof can be used. A skilled person will further appreciate that, instead of an anionic polymer, also an anionic surfactant can be used in the composition of the present invention. A surfactant can be classified by the presence of formally charged groups in its head. If the charge is negative, the surfactant is specifically called 'anionic'. Some commonly encountered anionic surfactants are: a) sulfates such as alkyl sulfates (ammonium lauryl sulfate, sodium lauryl sulfate (SDS)) and alkyl ether sulfates (sodium laureth sulfate, also known as sodium lauryl ether sulfate (SLES), sodium myreth sulfate), b) sulfonates such as docusates (dioctyl sodium sulfosuccinate), sulfonate fluorosurfactants (perfluorooctanesulfonate (PFOS), perfluorobutanesulfonate) and alkyl benzene sulfonates; c) phosphates such as alkyl aryl ether phosphate and alkyl ether phosphate and d) carboxylates such as alkyl carboxylates (fatty acid salts (soaps): sodium stearate)), sodium lauroyl sarcosinate and carboxylate fluorosurfactants (perfluorononanoate, perfluorooctanoate (PFOA or PFO)).

The present invention further specifically relates to the usages as indicated above wherein said clay is mixed with 2% up to 16% by dry weight of said anionic polymer. This means that the clayey barrier of the present invention may comprise, by dry weight, for example 98% clay and 2% anionic polymer (such a clay is also denominated as HYPER clay 2%), 97% clay and 3% anionic polymer, 96% clay and 4% anionic polymer(such a clay is also denominated as HYPER clay 4%), 95% clay and 5% anionic polymer, 94% clay and 6% anionic polymer, 93% clay and 7% anionic polymer, 92% clay and 8% anionic polymer(such a clay is also denominated as HYPER clay 8%), 91% clay and 9% anionic polymer, 90% clay and 10% anionic polymer, 89% clay and 11% anionic polymer, 88% clay and 12% anionic polymer, 87% clay and 13% anionic polymer, 86% clay and 14% anionic polymer, 85% clay and 15% anionic polymer, or 84% clay and 16% anionic polymer(such a clay is also denominated as HYPER clay 16%). However, it should be clear the clay of the present invention can also be mixed with less than 2% (i.e. 1%) or more than 16% (i.e. 17, 18, 19, 20, 21, 22, 23, 24, 25% or more) by dry weight of said anionic polymer.

The present invention also relates to the usages as indicated above wherein said dehydrating is preferably undertaken by oven drying at 105° C. the slurries of clay, polymer and water resulting from said mixing a dry clay with an anionic polymer solution. However, it is clear that any other method of drying such as vacuum drying or via the usage of microwave, hot air and/or filterpress can be used. It should further be clear that said drying can also occur at a temperature above 60° C. such as 65° C., 70° C., 75° C., 80° C., 85° C., 90° C., 95° C., 100° C., 105° C., 110° C., 115 ° C., 120° C. . . .

In some instances, improvements in the performance of clays of the present invention can be obtained when dehydration occurs at a temperature of at least 45° C. as is for example described in Example 3.

Drying methods such as oven drying methods can follow ASTM D2216 (remove the adsorbed water on to a soil surface by placing the soil in an oven at (45° C.)60°-105° C. for about 16 hours: ASTM D2216=Standard Test Method for Laboratory Determination of Water (Moisture) Content of Soil And Rock by Mass, or ASTM D4643 (remove the adsorbed water by placing the soil in a microwave in several steps lasting few minutes until the weight is constant; ASTM D4643=Standard Test Method for Determination of Water (Moisture) Content of Soil by the Microwave Oven Heating), or drying the soil at air or under vacuum at high temperatures)((45°)60°-105° C.).

Figure 1:
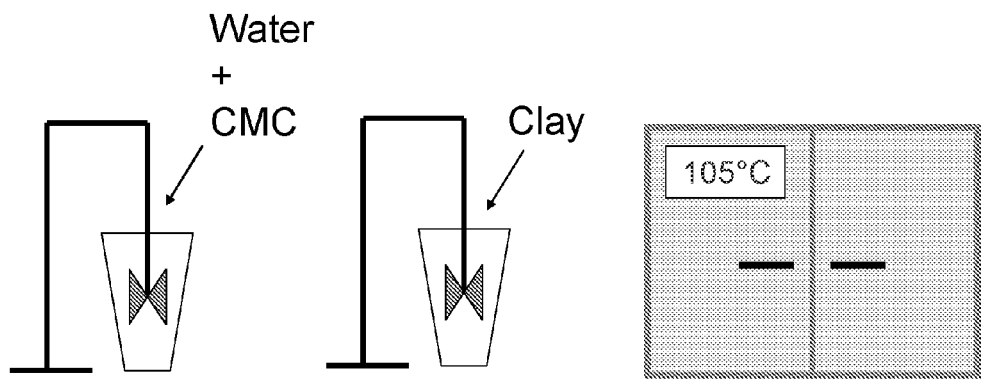
FIG. 1: First the powder polymer is diluted in deionised water with a mechanical stirrer, then the clay is poured and mixed with the polymeric solution for about 30 minutes. Finally the slurry is placed in an oven (105° C.) overnight (about 16 hours).
Figure 2:
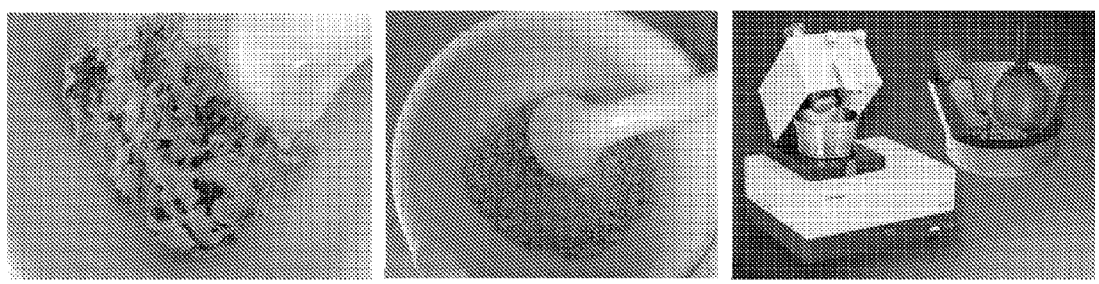
FIG. 2: After drying, the treated bentonites were ground using first a mortar and pestle and then a mortar grinder.

The present invention further relates to the usages as described above wherein said composition is ground (see FIG. 2) after said dehydrating said clay treated with an anionic polymer and/or is rehydrated before use as a hydraulic clayey barrier. Grinding can be undertaken by any known method such as the usage of an automatic grinder with stainless steel mortar and pestle or by hand using a ceramic mortar and pestle. It should be clear that the dehydration is needed to enhance the polymer adsorption. This resulting powder can then be used as such and permeated directly with polluted water (in the results section further such samples are referred to as "non-prehydrated samples"), or, can be prehydrated with deionized water (in the results section further such samples are referred to as "prehydrated samples"). The prehydration with water is beneficial for the hydraulic conductivity of untreated clays. On the other hand, prolonged prehydration with water resulted in release of amendments as is described before for MSB. Conversely, the clays of the present invention show improved hydraulic performance in both cases, prehydrated and non-prehydrated as is shown further in the examples.

The present invention further relates to the usages as described above wherein said hydraulic clayey barrier is a part of a compacted clay liner (CCL) or part of a geosynthetic clay liner (GCL). A compacted clay liner (CCL) is well-known in the art and is used in cover systems and bottom liners for landfills. CCLs are natural clay material compacted in situ with a minimum thickness prescribed by national regulations. Geosynthetic clay liners (GCLs), are also well-known in the art and are factory-manufactured clay liners consisting of a thin layer of bentonite encased by geotextiles or glued to a geomembrane.

The present invention finally relates to the usages as described above to isolate waste liquids from the environment or as a sealing powder or paste as described above.

The present invention will now be illustrated by the following non-limiting examples.

EXAMPLES

Example 1

Methodology:

A chemical-resistant so-called 'HYPER clay 2%' (i.e. a clay of the invention treated with 2% Na-CMC) or engineered clay was obtained by treating a bentonite clay with 2% by dry weight of an anionic polymer, the Sodium Carboxymethyl Cellulose (Na-CMC). The clay was poured in a polymeric solution using a mechanical stirrer for 30 minutes. The slurries obtained were then oven dried at 105° C. This sequence of preparation is important to improve the long-term adsorption of the polymer on to the clay surface. After drying, the bentonites were ground using a mortar grinder.

Results:

An engineered clay (the so-called HYPER clay) was developed by adsorbing an anionic polymer to the surface of an untreated bentonite. Furthermore, two commercially available polymer treated clays were studied: a Multiswellable Bentonite (MSB) and a Dense Prehydrated GCL (DPH GCL). To demonstrate the potential benefits of polymer treatment, index properties and swelling ability were evaluated. Subsequently, hydraulic and chemico-osmotic tests were executed on untreated and polymer treated clays to evaluate their resistance to chemical attack.

Material Characterization

Figure 4:
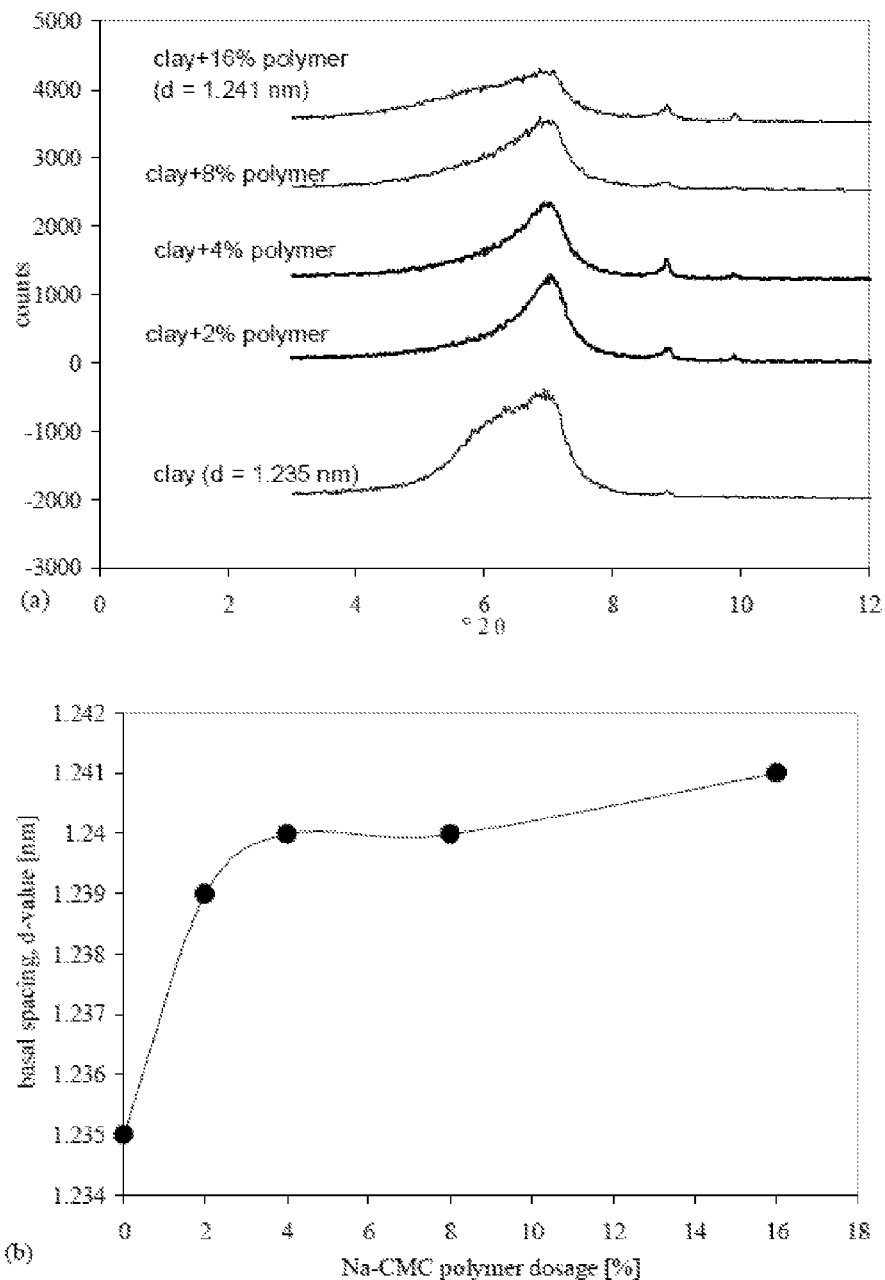
FIG. 4: XRD analysis results (a) Shift of the basal spacing, d, with increasing polymer dosage. (b) Increase of the basal spacing with increasing polymer dosage.

The effect of polymers adsorption on clays was studied by physical and chemical analysis that demonstrated the potential benefits of polymers on the sealing, hydraulic and membrane properties of clays. XRD analysis of the clay demonstrated (the basal spacing, d, of the untreated clay was d=1.235 nm; of the hyper clay 2% was d=1.239; hyper clay 4% was d=1.24; hyper clay 8% was d=1.24; hyper clay 16% was d=1.241; see FIG. 4) the intercalation of the anionic polymer in the interlayer region of the clay inducing a dispersed clay structure with a consequent potential decrease of the hydraulic conductivity.

Figure 5:
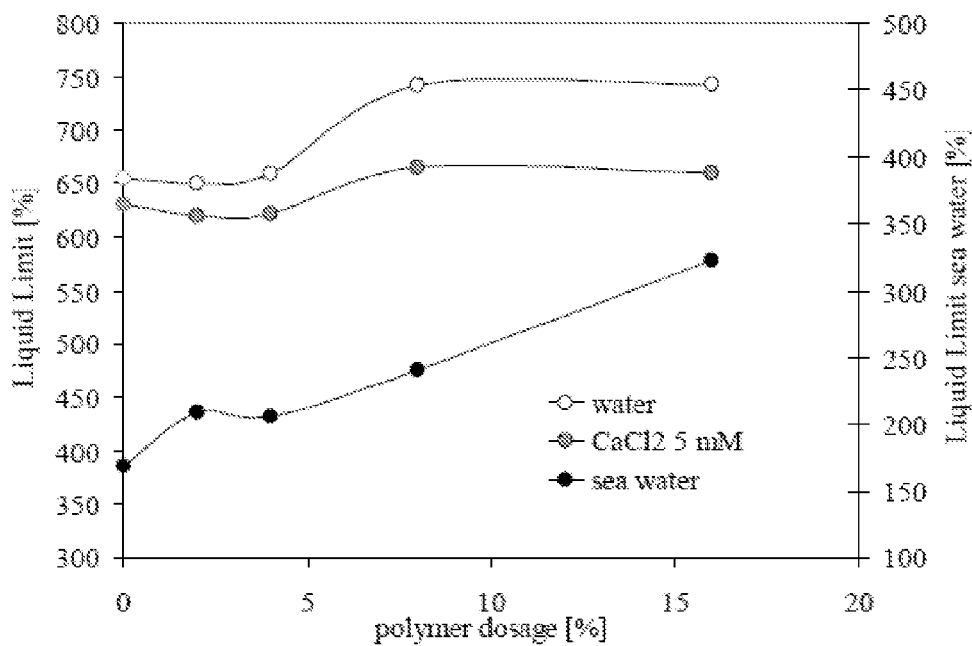
FIG. 5. Liquid Limit increase with increasing polymer dosage.
Figure 6:
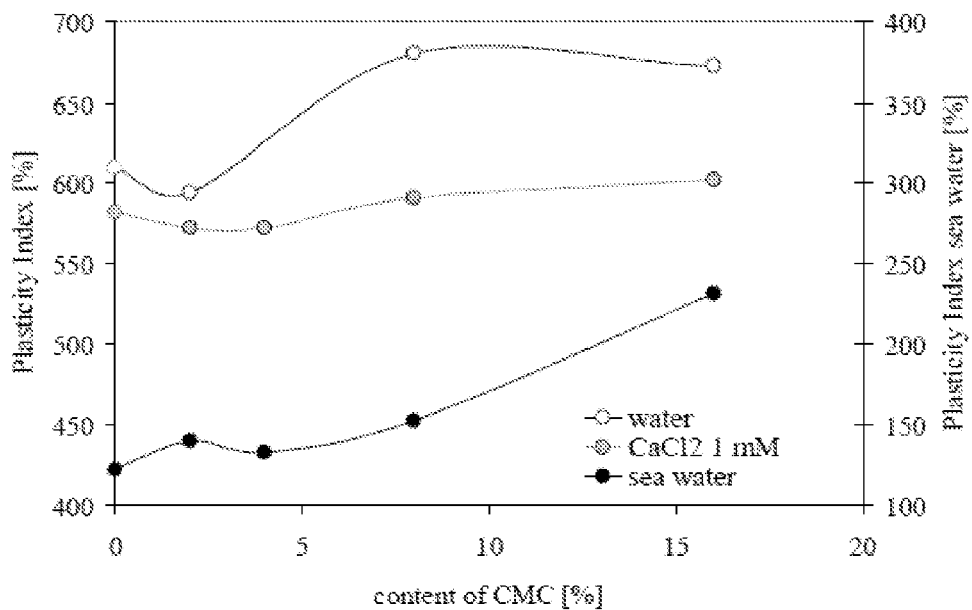
FIG. 6. Plasticity index increase with increasing polymer dosage.
Figure 7:
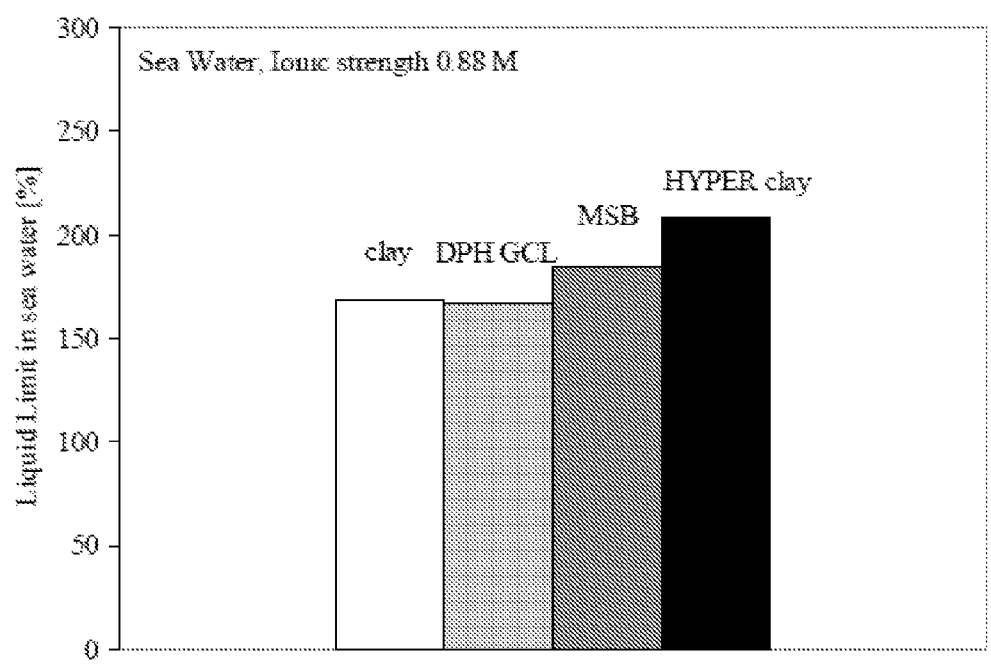
FIG. 7. Liquid limit of the HYPER clay 2% compared to other clays in sea water.

Moreover, the liquid limit (water adsorption capacity; ASTM D4318) of the clay in deionized water and electrolyte solutions increased with increasing polymer dosage showing a potential benefit of the polymer on preserving the hydraulic performance of the clay. The liquid limit (LL) of the untreated clay in sea water was LL=122%, lower than that of the HYPER clay 2% that was LL=139.5%, and that of the HYPER clay 4% that was LL=205.77%, and lower than that of the HYPER clay 8% LL=240.51%, and HYPER clay 16% with LL=322.75%; see also FIG. 5-7. By adding the polymer, an increase of exchangeable Na+ in the composition of the exchange complex of the clay was observed, indicating a potential enhancement of the quality of the clay due to polymer addition. This result is important as the liquid limit is related to the hydraulic performance of a clay (Lee et al. 2005).

Swelling Ability

Figure 8:
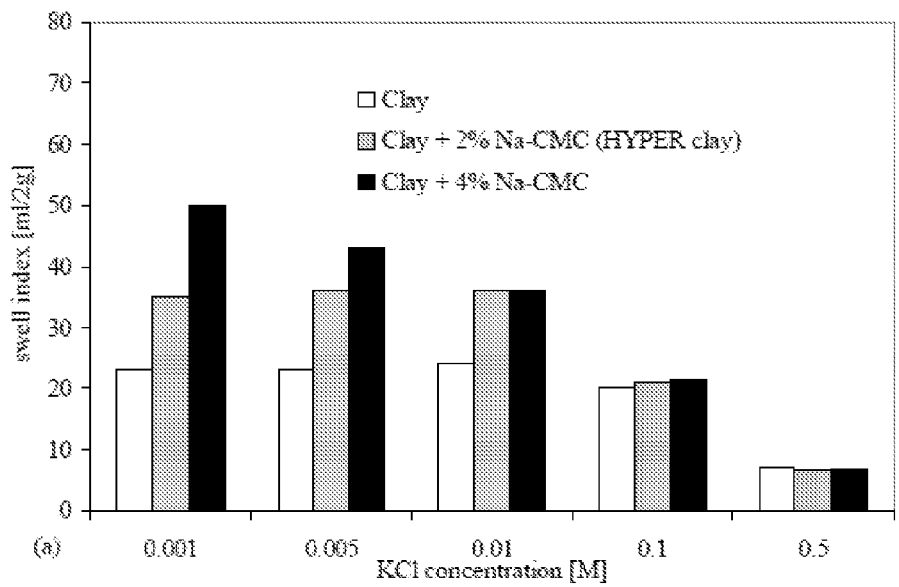
FIG. 8. The addition of 2% Na-CMC to the clay improved its swelling ability in (a) KCl solutions and (b) $CaCl_2$ solutions.
Figure 8:
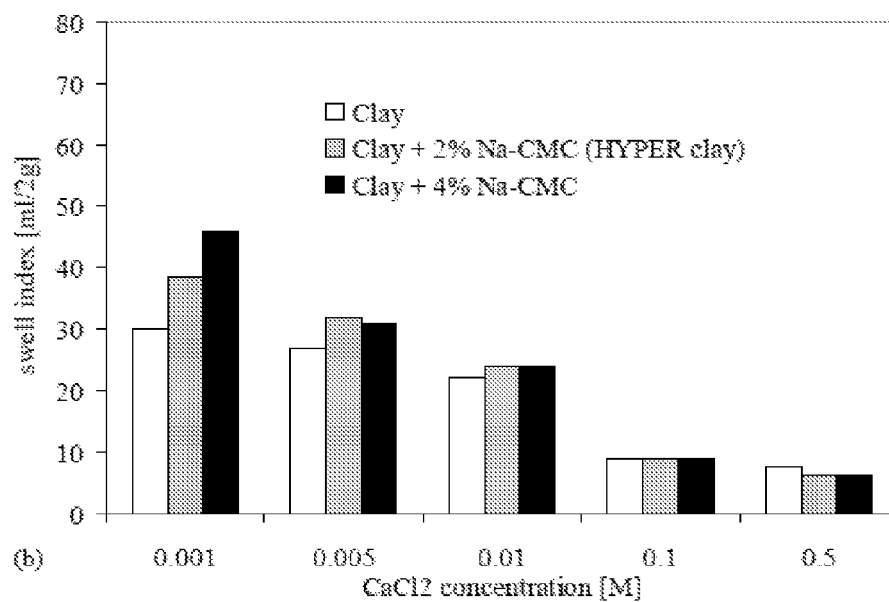
Figure 9:
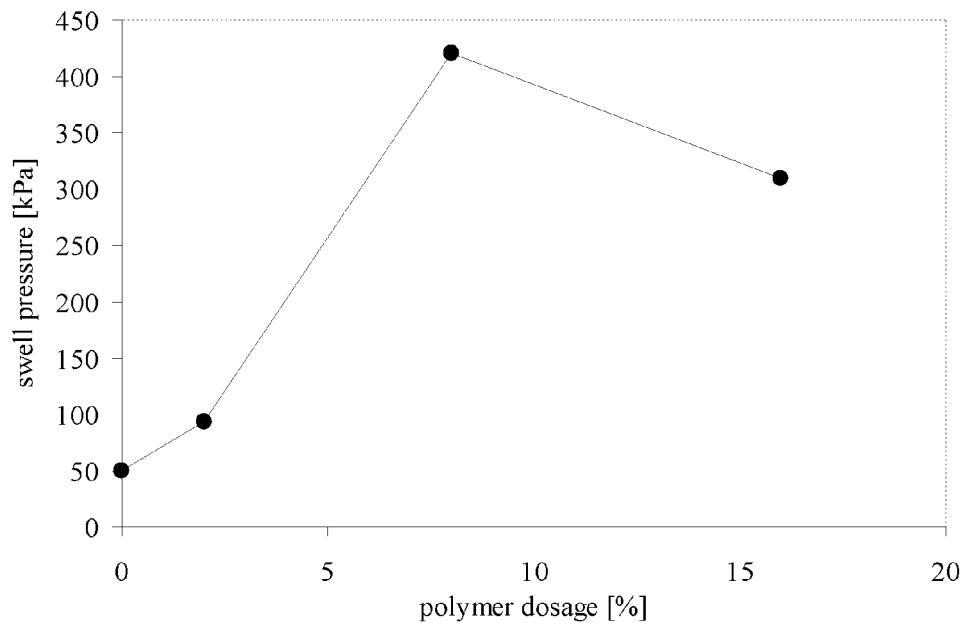
FIG. 9. Increase of the swell pressure with increasing polymer (Na-CMC) dosage in a 5 mM $CaCl_2$ solution.
Figure 10:
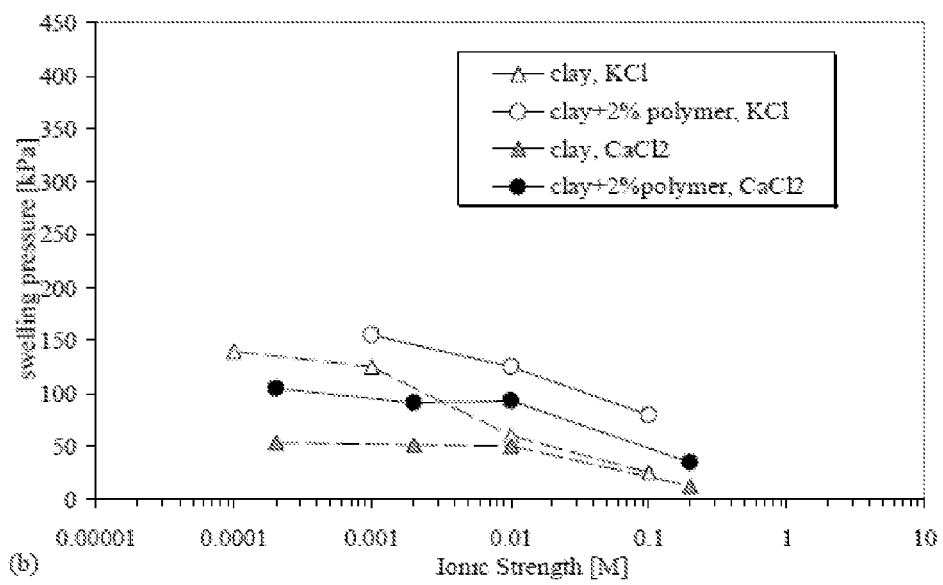
FIG. 10. Increase of the swell pressure of the HYPER clay 2% compared to the untreated clay due to the polymer treatment in KCl and $CaCl_2$ solutions.
Figure 11:
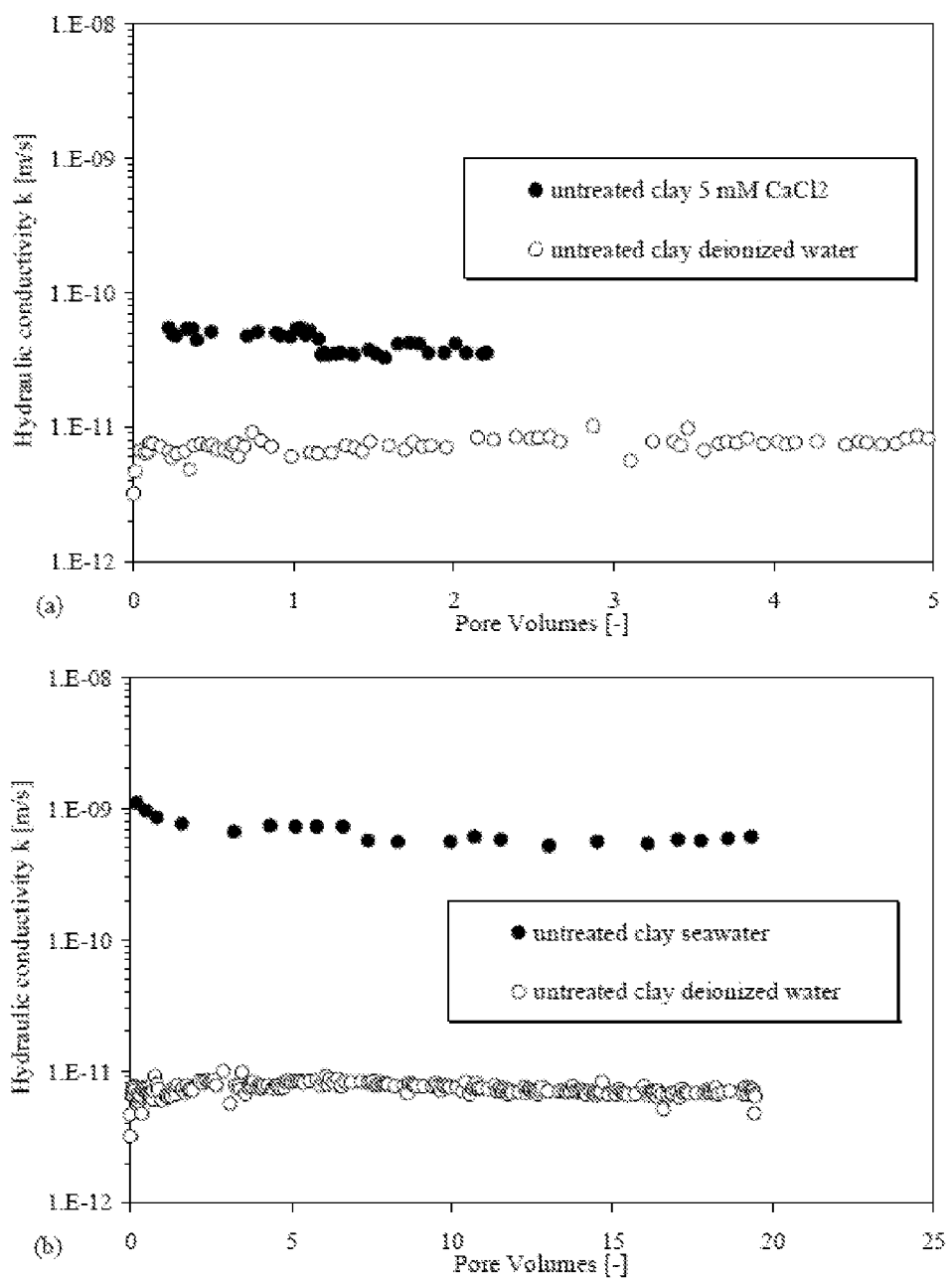
FIG. 11. Hydraulic conductivity "non-prehydrated" results: Increase of the hydraulic conductivity of the untreated clay to $CaCl_2$ 5 mM and sea water compared to deionized water due to the compression of the double layer in presence of $Ca^{2+}$.

The swelling ability of the treated clays was quantified by means of standard swell index test (ASTM D5890) and swelling pressure tests as described by Di Emidio et al. (2007). Both showed that the treatment with the anionic polymer studied here improved the swelling ability of the untreated clay. The swell index (SI) of the untreated clay to water was SI=26 ml/2 g lower than that of the HYPER clay 2% with SI=37 ml/2 g and that of the HYPER clay 4% with SI=55 ml/2 g, see also FIG. 8-10 where the SI of the HYPER clays is higher than that of the untreated clay in various solutions. This result is important because the swelling ability is related to the hydraulic performance of a clay (Jo et al. 2001).

Hydraulic Conductivity Performance

Hydraulic conductivity tests were conducted on untreated and polymer treated clays. The hydraulic conductivity of untreated clays ($k_{clay}$) increased by permeating the samples with electrolyte solutions due to the compression of the double layer thickness. Conversely, polymer treated clays maintained low hydraulic conductivity to CaCl2 and to sea water even in the long term. The hydraulic conductivity values were:

$k_{clay}$(to water)=$6.42*10^{-12}$ m/s; $k_{clay}$(to $CaCl_2$ 5 mM)=$3.53*10^{-11}$ m/s; $k_{clay}$(to seawater)=$6*10^{-10}$ m/s;

$k_{hyperclay2\%}$(to water)=$6.5*10^{-12}$ m/s; $k_{hyperclay2\%}$(to $CaCl_2$ 5 mM)=$1.37*10^{-11}$ m/s; $k_{hyperclay2\%}$(to seawater)=$4.17*10^{-11}$ m/s; see also appendix FIG. 11-14.

Figure 15:
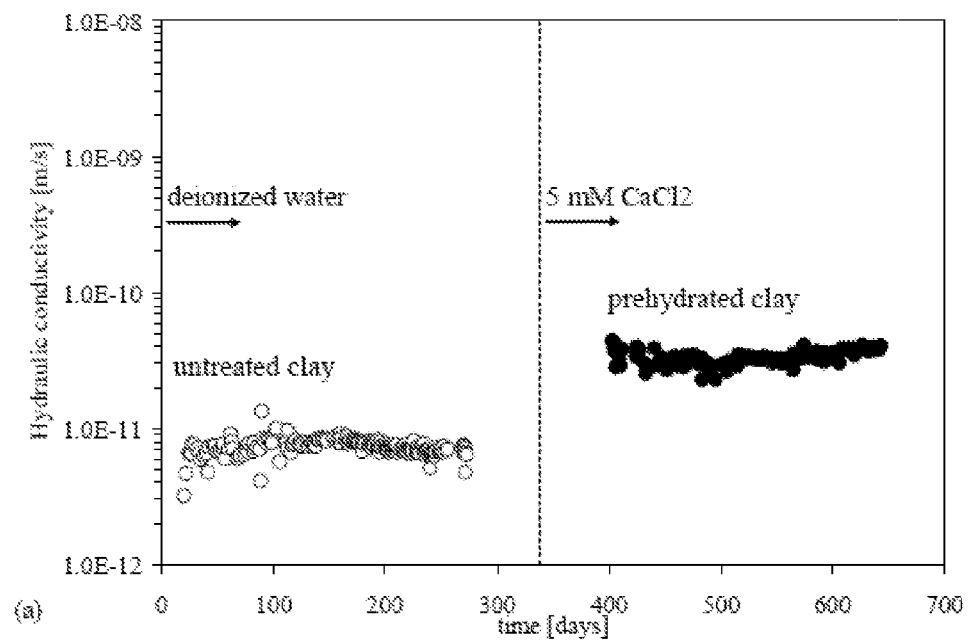
FIG. 15. Hydraulic conductivity "prehydrated" results: the hydraulic conductivity to 5 mM CaCl2 solution of the untreated clay (figure a) is higher than that of the HYPER clay 2% (figure b) even after prolonged prehydration with water.
Figure 15:
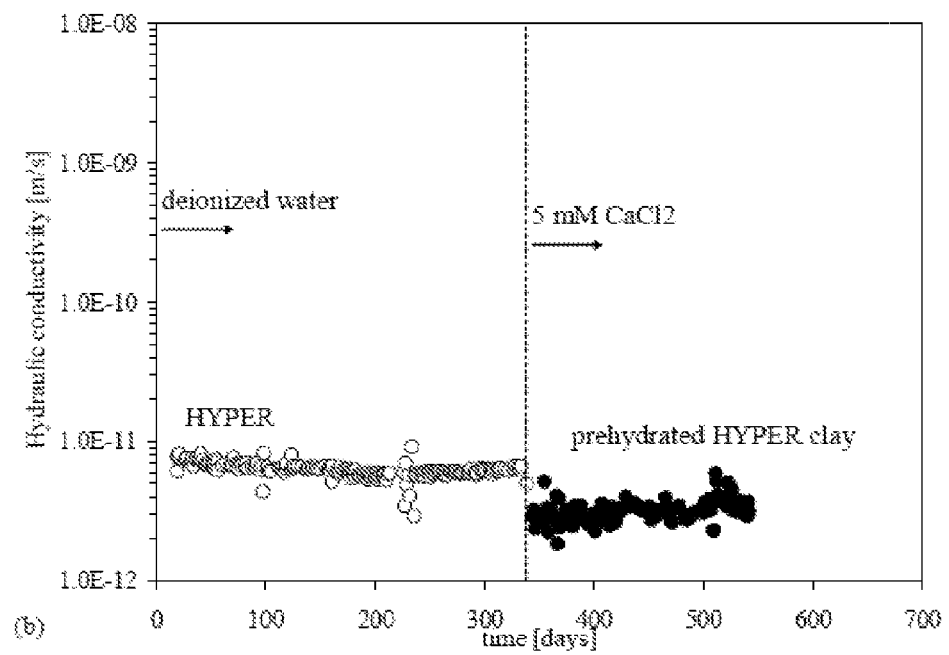

The prehydration of untreated clay samples produced only a limited benefit on the hydraulic conductivity (hydraulic conductivity after prehydration=kp) to electrolyte solutions. On the other hand, the polymer treatment and the prehydration together were able to maintain a very low hydraulic conductivity to electrolyte solutions, comparable to the hydraulic conductivity to deionized water. The hydraulic conductivity values were: $kp_{clay}$(to $CaCl_2$ 5 mM)=$4.02 E^{-11}$ m/s, $kp_{hyperclay2\%}$(to $CaCl_2$ 5 mM)=$3.1 E^{-12}$ m/s, see FIG. 15-17.

Figure 16:
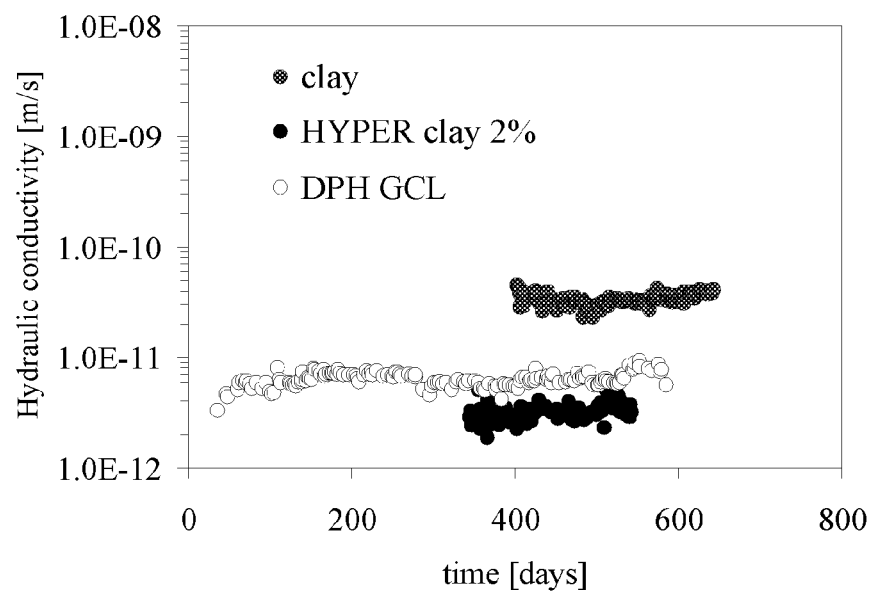
FIG. 16. The hydraulic conductivity to $CaCl_2$ 5 mM of the HYPER clay 2% after prehydration is lower than that of the DPH GCL.
Figure 17:
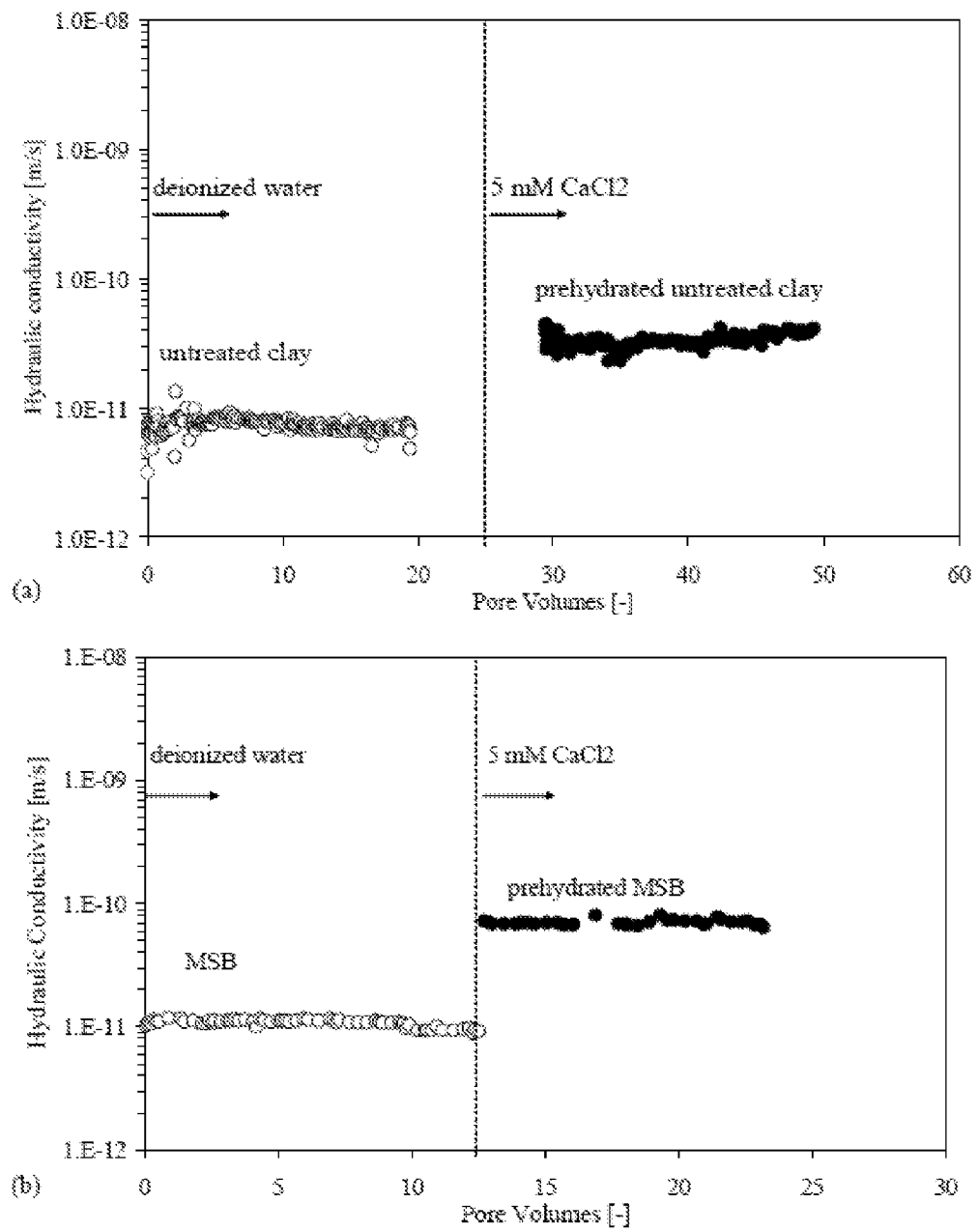
FIG. 17. The hydraulic conductivity to $CaCl_2$ 5 mM of the MSB (Figure b) after prehydration with deionised water showed a hydraulic conductivity higher compared to the untreated clay (Figure a) (probably after release of the amendment due to prolonged prehydration with water).
Figure 18:
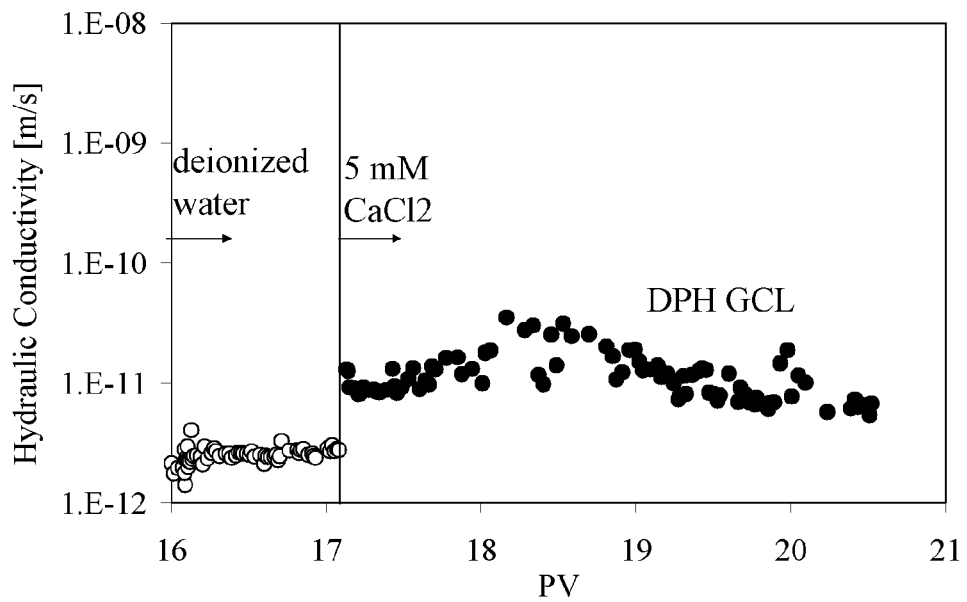
FIG. 18. Hydraulic conductivity to $CaCl_2$ 5 mM of the DPH GCL after prolonged prehydration with deionized water. This hydraulic conductivity is higher compared to the hydraulic conductivity to deionized water.

The HYPER clay prehydrated with deionized water showed a hydraulic conductivity to $CaCl_2$ similar to that of the DPH GCL as received (which means prehydrated during manufacturing with a polymeric solution), as shown in FIG. 16. This result demonstrates that the treatment with Na-CMC alone—no need of the other components present in the DPH GCL—and the particular sequence of preparation—mixing with a polymeric solution and then drying at sufficiently high temperatures—allow the HYPER clay to obtain equal or better results than other modified clays.

The hydraulic conductivity (kp) of the HYPER clay to CaCl2 5 mM after prolonged prehydration with deionized water was lower compared to MSB and to DPH GCL ($kp_{hyperclay2\%}$=$3.1 E^{-12}$ m/s, $kp_{MSB}$=$6 E^{-11}$ m/s, $kp_{DPH\ GCL}$=$1.11 E^{-11}$ m/s see FIG. 15-17-18). The HYPER clay showed a better performance, because the MSB and the DPH GCL probably released the organic compounds after prolonged prehydration. This results demonstrate that the sequence of preparation followed to treat the Hyper clay is crucial to improve the long-term adsorption of the polymer on to the clay surface.

Chemico-osmotic Efficiency and Diffusion Coefficient

The effect of partial or complete destruction of membrane behavior due to diffusion was observed in untreated clays. The clay showed in fact initial membrane behavior, that gradually decreased due to the gradual compression of the double layer thickness due to diffusion of invading cations.

On the other hand, the polymer treatment with the anionic polymer protected the HYPER clay against the destructive role of diffusion, maintaining the initial osmotic efficiency ($\omega$) in the long term in presence 1 mM and 5 mM CaCl2 solutions:

$\omega_{clay(CaCl2=1\ mM)}$=0.29; $\omega_{clay(CaCl2=5\ mM)}$=0

$\omega_{hyperclay2\%(CaCl2=1\ mM)}$=0.65; $\omega_{hyperclay2\%}$(CaCl2=5 mM)=0.13

This result demonstrates that the polymer treatment modified the bentonite structure such that the double layer thickness of the clay resisted collapse and the membrane efficiency was sustained.

Nevertheless, special attention should be given to the method of polymer treatment used to preserve the adsorption of the polymer onto the clay in the long term. Unlike the HYPER clay, the MSB showed a decrease of the chemico-osmotic efficiency with time. This gradual decrease of the membrane efficiency was attributed to the probable release of the polymers during prolonged prehydration with deionized water before the tests.

The transport parameters of the clays were evaluated with the chemico-osmotic tests as described by Mazzieri et al. (2010). The diffusion coefficient (D) of the HYPER clay was lower than that of the natural clay:

$D_{clay}(Cl^-)=2.22*10^{-10}$ m²/s; $D_{clay}(Ca^{2+})=2.22*10^{-10}$ m²/s;

$D_{hyperclay2\%}(Cl^-)=1.67*10^{-10}$ m²/s; $D_{hyperclay2\%}(Ca^{2+})=1.35*10^{-10}$ m²/s This result suggests that the polymer protected the exchangeable sodium of the HYPER clay from cation exchange with Ca2+.

Example 2

Figure 19:
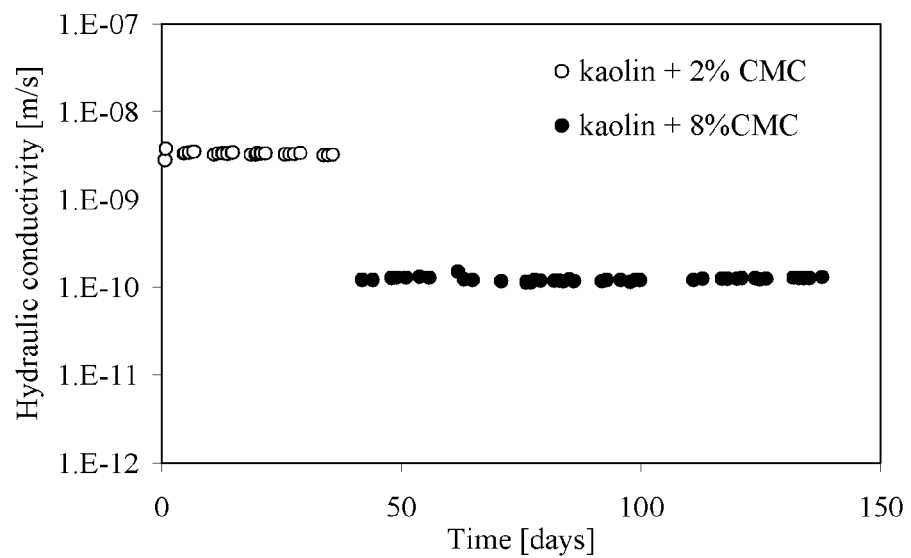
FIG. 19. Hydraulic conductivity to seawater of the kaolin treated with 2% CMC compared to the hydraulic conductivity of the kaolin treated with 8% CMC. Increasing the polymer dosage decreased the hydraulic conductivity.

FIG. 19 shows the hydraulic conductivity to seawater of a kaolin Rotoclay treated with the HYPER clay method with 2% CMC and 8% CMC. The kaolin was first mixed with the polymeric solution, then dried at 105° C. and finally grinded. As shown in the graph, the hydraulic conductivity to seawater of the kaolin treated with 8% CMC is lower compared to the hydraulic conductivity of the kaolin treated with 2% CMC. This result demonstrates that increasing the dosage of the CMC polymer, the hydraulic conductivity of the kaolin decreased.

Example 3

Figure 20:
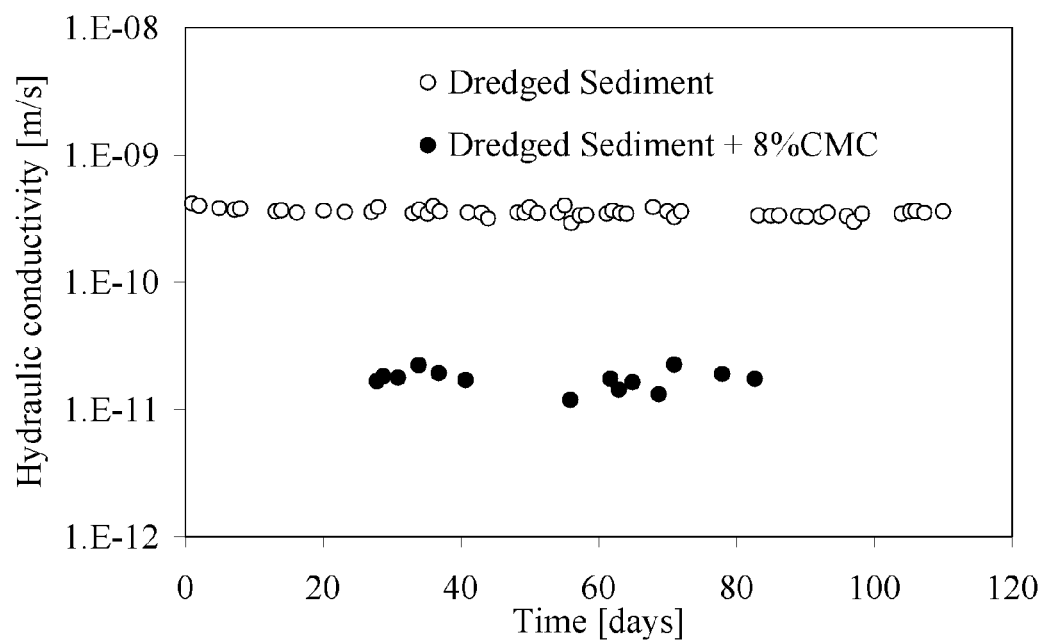
FIG. 20. Hydraulic conductivity of the dredged sediment to seawater compared to the dredged sediment treated with 8% CMC.

FIG. 20 shows the hydraulic conductivity of a Dredged Sediment treated with 8% CMC compared to the hydraulic conductivity of the untreated Dredged Sediment. The Dredged Sediment was mixed with a polymeric solution, then dried in an oven at 45° C., then crushed (to granules size) by hand with mortar and pestle, finally compacted following ASTM D0698 to simulate a Compacted Clay Liner (CCL). As shown in the graph in FIG. 20, the hydraulic conductivity of the Dredged sediment was lower compared to the hydraulic conductivity of the untreated dredged sediment. This result demonstrates that the dredged sediment can be treated with the Hyper clay method and improve its hydraulic performance.

Example 4

HYPER Clay Processing in situ

Figure 21:
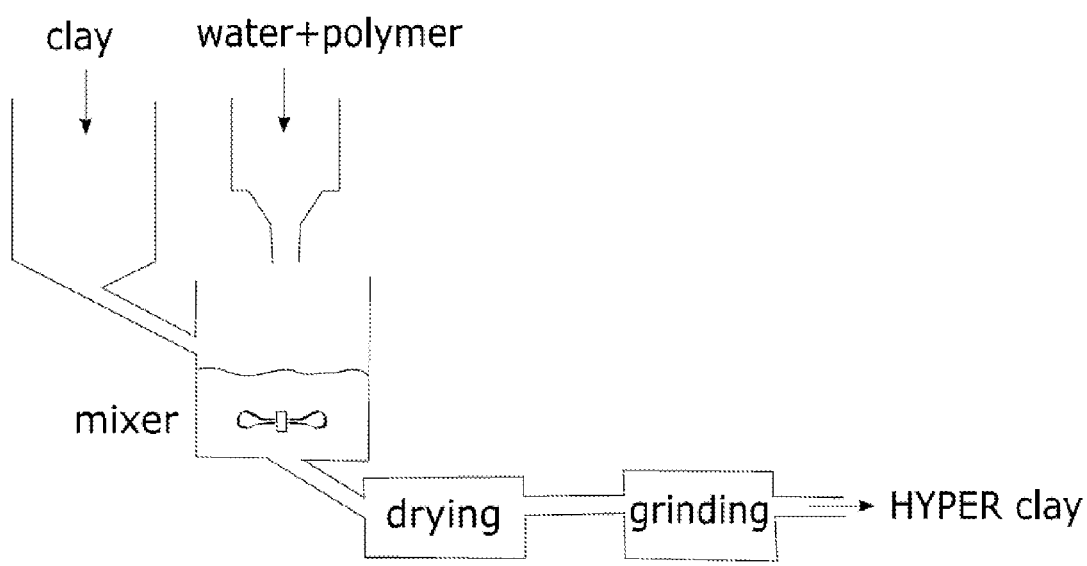
FIG. 21. Bentonite processing with the addition of polymers

A conventional bentonite processing plant is provided with all the infrastructure needed for the production of the HYPER clay (FIG. 21). The production of the HYPER clay has limited additional costs. The most common method of mining bentonite is the open pit method. After the bentonite is mined, it is processed in a bentonite processing plant, where it is mixed, eventually activated, within one hour after the material has been mined. Then, the material is screened, crushed, dried, milled and bagged within two to three hours. For the processing of HYPER clay the same timing of the processes is or may be followed.

After mining, water is commonly added to bentonites creating clay slurries to enhance the reaction with some additives or to remove impurities and eventual additives excess. Additives addition could be made before drying. It is during this step that the polymeric solution is added without major changes in the usual bentonite processing. Then the bentonite is dried in a coal-fired rotary dryer. Once delivered from the rotary dryer, the bentonite is processed into either a fine powder or granulated into small particles.

REFERENCES

Ashmawy, A. K., El-Hajji, D., Sotelo, N., and Muhammad, N. (2002). "Hydraulic performance of untreated and polymer-treated bentonite in inorganic landfill leachates. " Clays and Clay Minerals 50(5): 546-552.

Bartelt-Hunt, S. L., Burns, S. E., Culver, T. B. and Smith, J. A. "Optimal design of a compacted soil liner containing sorptive amendments". Geo-Frontiers 2005

Di Emidio G., F. Mazzieri, P. Van Impe, W. Van Impe (2007). Hydraulic Conductivity, Free Swell and Swelling Pressure of a Dense Prehydrated GCL. Proceedings of the First Middle European Conference on Landfill Technology. DGGT Germany and Hungarian ISSMGE. Nov. 19-20, 2007, Budapest, Hungary Di Emidio, G., Mazzieri, F., Van Impe, P. O., and Van Impe, W. F. (2008). "Hydraulic conductivity performance of a Dense Prehydrated GCL overlap permeated with sea water." Proceedings Geoamericas 2008 , 2-5 Mar. 2008, Cancun.

Flynn, B. N. and Carter, G. C. (1998). "Waterproofing Material and Method of Fabrication Thereof." U.S. Pat. No.: 6,537,676 B1.

Jo, H., Katsumi, T., Benson, C. H., and Edil, T. B. (2001). "Hydraulic conductivity and swelling of non-prehydrated GCLs permeated with single species salt solutions." J. of Geotechnical and Geoenvironmental Eng, 127: 557-567.

Katsumi, T., Ishimori, H., Onikata, M., and Fukagawa, R. (2008). "Long-term barrier performance of modified bentonite materials against sodium and calcium permeant solutions." Geotextiles and Geomembranes, 26: 14-30.

Kolstad, D. C., Benson, C. H., Edil, T. B., and Jo, H. Y. (2004). "Hydraulic conductivity of a dense prehydrated GCL permeated with aggressive inorganic solutions." Geosynthetics International. 11(3): 233-241.

Kondo, 1996. "Method of activation of clay and activated clay". U.S. Pat. No.: 5,573,583.

Lee, J. M., Shackelford, C. D., Benson, C. H., Jo, H. Y., and Edil, T. B. (2005). "Correlating index properties and hydraulic conductivity of geosynthetic clay liners." Journal of Geotechnical and Geoenvironmental Engineering, 131 (11): 1319-1329.

Lo, I. M. C., Mak, R. K. M., and Lee. S. C. H. 1997. "Modified Clays for waste containment and pollutant attenuation." Journal of Environ-mental Engineering. ASCE, Vol.123, No.1, pp. 25-32.

Lorenzetti, R. J., Bartelt-Hunt, S. L., Burns, S. E., and Smith, J. A. (2005). "Hydraulic Conductivities and Effective Diffusion Coefficients of GCLs with Organobentonite Amendments." Geo-Frontiers 2005, ASCE, GSP 142.

Mazzieri, F., Di Emidio, G. and Van Impe, P. O. (2010). Diffusion of cacl2 in a modified bentonite: impact on osmotic efficiency and hydraulic conductivity, Clays and Clay Minerals 58(2).

Mazzieri, F. and Pasqualini, E. (2006). Evaluating the permeability of an organically modified bentonite to natural seawater, Proceedings of the 5th International Congress on Environmental Geotechnics, Cardiff, Wales, UK.

Mazzieri, F. and Pasqualini, E. (2008). Effect of dry/wet cycles and cation exchange on the permeability of a dense prehydrated gcl, Proceedings McRory, J. A. and Ashmawy, A. K. (2005). "Polymer treatment of bentonite clay for contaminant resistant barriers." Geo-Frontiers 2005, pp. 130-142.

Onikata, M., Kondo, M., Hayashi, N., and Yamanaka, S. (1999). "Complex formation of cation-exchanged montmorillonites with propylene carbonate: osmotic swelling in aqueous electrolyte solutions." Clay and clay minerals. 47(5): 672-677.

Schroeder, C., Monjoie, A., Illing, P. Dosquet, D., and Thorez, J. (2001). "Testing a Factory-Prehydrated GCL under Several Conditions." Proceedings Sardinia 2001, CISA, Cagliari, Italy, 1: 188-196.

Shackelford, C. D. (2005). Environmental issues in geotechnical engineering, Proceedings of the 16th International Conference on Soil Mechanics and Geotechnical Engineering. Sep. 12-16, 2005, Osaka, Japan.

Simon, F.-G. and Müller, W. W. (2005). "Standard and alternative landfill capping design in Germany." Environmental Science and Policy, 7: 277-290.

Stumm, W. (1992). "Chemistry of the solid-water interface." Wiley, New York.

Stutzmann, T. and Siffert, B. (1977). Contribution to the adsorption mechanism of acetamide and polyacrylamide on to clays, Clays and Clay Minerals 25: 392-406.

Theng, B. K. G. (1982). "Clay-Polymer Interactions: Summary and Perspectives." Clays and Clay Minerals, 30: 1-10.

The invention claimed is:

1. A method of preparing a hydraulic clayey barrier comprising:
   a) wetting a clay by mixing the clay with a solution comprising an anionic polymer to obtain a slurry of clay treated with an anionic polymer, and
   b) drying the slurry of clay and anionic polymer in order to expel water molecules and adsorb the polymer on the clay surface,
   wherein said hydraulic clayey barrier has the following characteristics: a basal spacing d>1,235 nm, a liquid limit LL>122%, a swell index SI>26 ml/2 g, a swell pressure SP>50 kPA, a hydraulic conductivity k to $CaCl_2$<3.53 $10^{-11}$ m/s and to seawater <6 $10^{-10}$ m/S, a chemico-osmotic efficiency $\omega_{CaCl2=1\ mM}$>0.29 and/or a diffusion coefficient D($Cl^-$ or $Ca^{2+}$)>2.22 $10^{-10}$ $m^2$/s.

2. The method of claim 1, wherein said clay is bentonite and wherein said anionic polymer is sodium carboxymethyl cellulose.

3. The method of claim 1, wherein said clay is bentonite.

4. The method of claim 1, wherein said anionic polymer is sodium carboxymethyl cellulose.

5. The method of claim 1, wherein said clay is mixed with 2% up to 16% by dry weight of said anionic polymer.

6. The method of claim 1, wherein said drying is undertaken by oven drying the slurries of clay, polymer and water resulting from said mixing a clay with an anionic polymer solution at a temperature higher than 60° C.

7. The method of claim 1, wherein said hydraulic clayey barrier is ground after said drying said clay treated with an anionic polymer and is rehydrated before use as a hydraulic clayey barrier.

8. The method of claim 1, wherein said hydraulic clayey barrier is ground after said drying said clay treated with an anionic polymer.

9. The method of claim 1, wherein said hydraulic clayey barrier is rehydrated before use as a hydraulic clayey barrier.

10. The method of claim 1, wherein said clay is dredging soil or kaolin.

11. The method of claim 1, wherein said hydraulic clayey barrier maintains its efficiency for at least 2000 days.

12. The method of claim 1, wherein said hydraulic clayey barrier is used for isolating waste liquids from the environment.

13. A method of isolating a waste liquid from the environment comprising:
   preparing a hydraulic clayey barrier by
   a) wetting a clay by mixing the clay with a solution comprising an anionic polymer to obtain a slurry of clay treated with an anionic polymer, and
   b) drying the slurry of clay and anionic polymer in order to expel water molecules and adsorb the polymer on the clay surface, wherein said drying is undertaken by oven drying at a temperature higher than 60° C. the slurries of clay, polymer and water resulting from said mixing a clay with an anionic polymer solution; and
   containing the waste liquid with a liner comprising said hydraulic clayey barrier, wherein said hydraulic clayey barrier maintains its efficiency for at least 2000 days, thereby isolating the waste liquid from the environment.

14. A method of isolating a waste liquid from the environment comprising containing
   the liquid with a liner comprising a hydraulic clayey barrier having the following characteristics: a basal spacing d>1,235 nm, a liquid limit LL>122%, a swell index SI>26 ml/2 g, a swell pressure SP>50 kPA, a hydraulic conductivity k to $CaCl_2$<3.53 $10^{-11}$ m/s and to seawater <6 $10^{-10}$ m/S, a chemico-osmotic efficiency $\omega_{CaCl2=1\ mM}$>0.29 and/or a diffusion coefficient D($Cl^-$ or $Ca^{2+}$)>2.22 $10^{-10}$ $m^2$/s.

* * * * *